June 5, 1934.   W. W. CARSON, JR   1,961,550
REGULATOR FOR HOT WATER HEATING SYSTEMS
Filed June 25, 1928    3 Sheets-Sheet 1
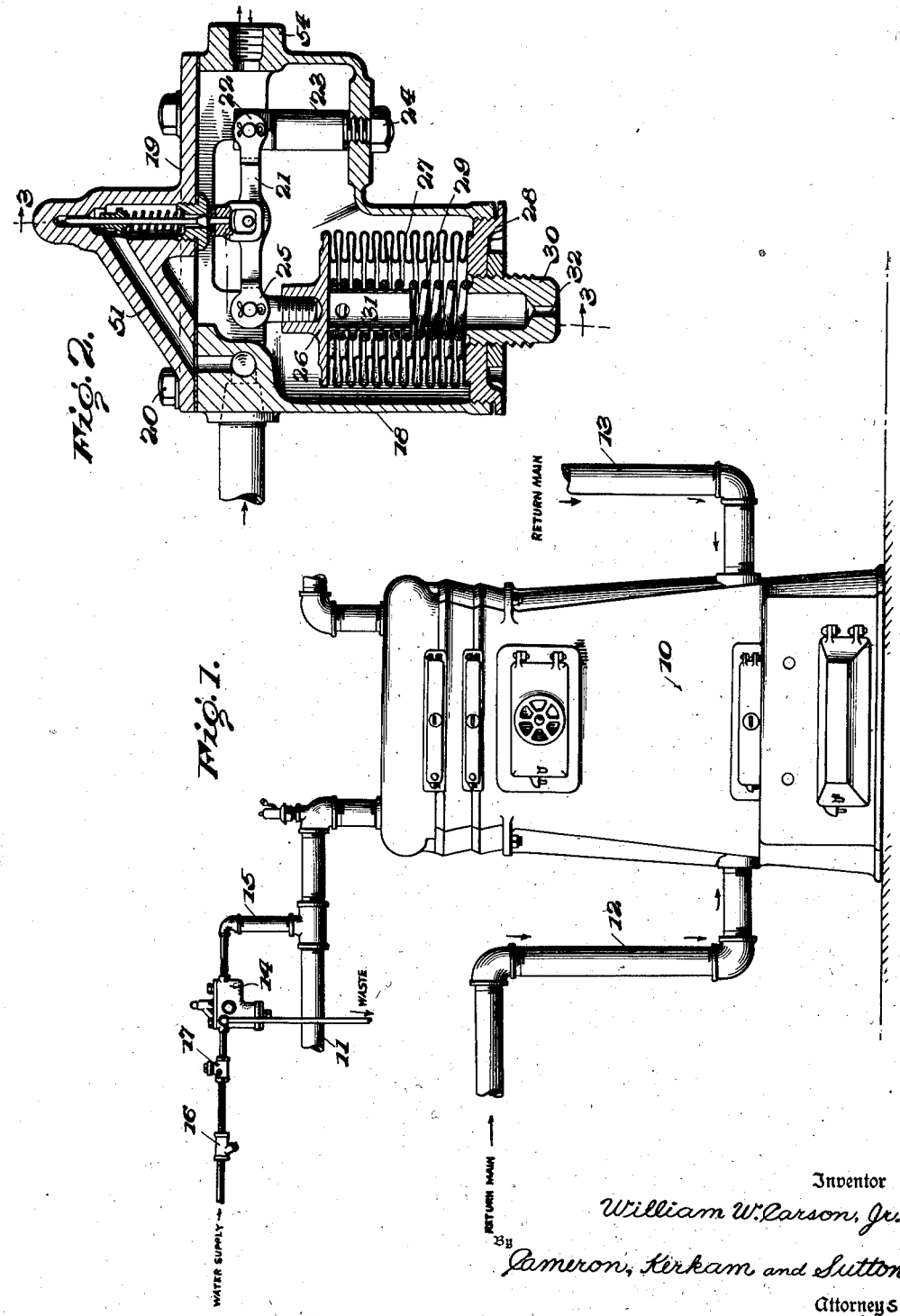
Inventor
William W. Carson, Jr.
By Cameron, Kirkam and Sutton.
Attorneys

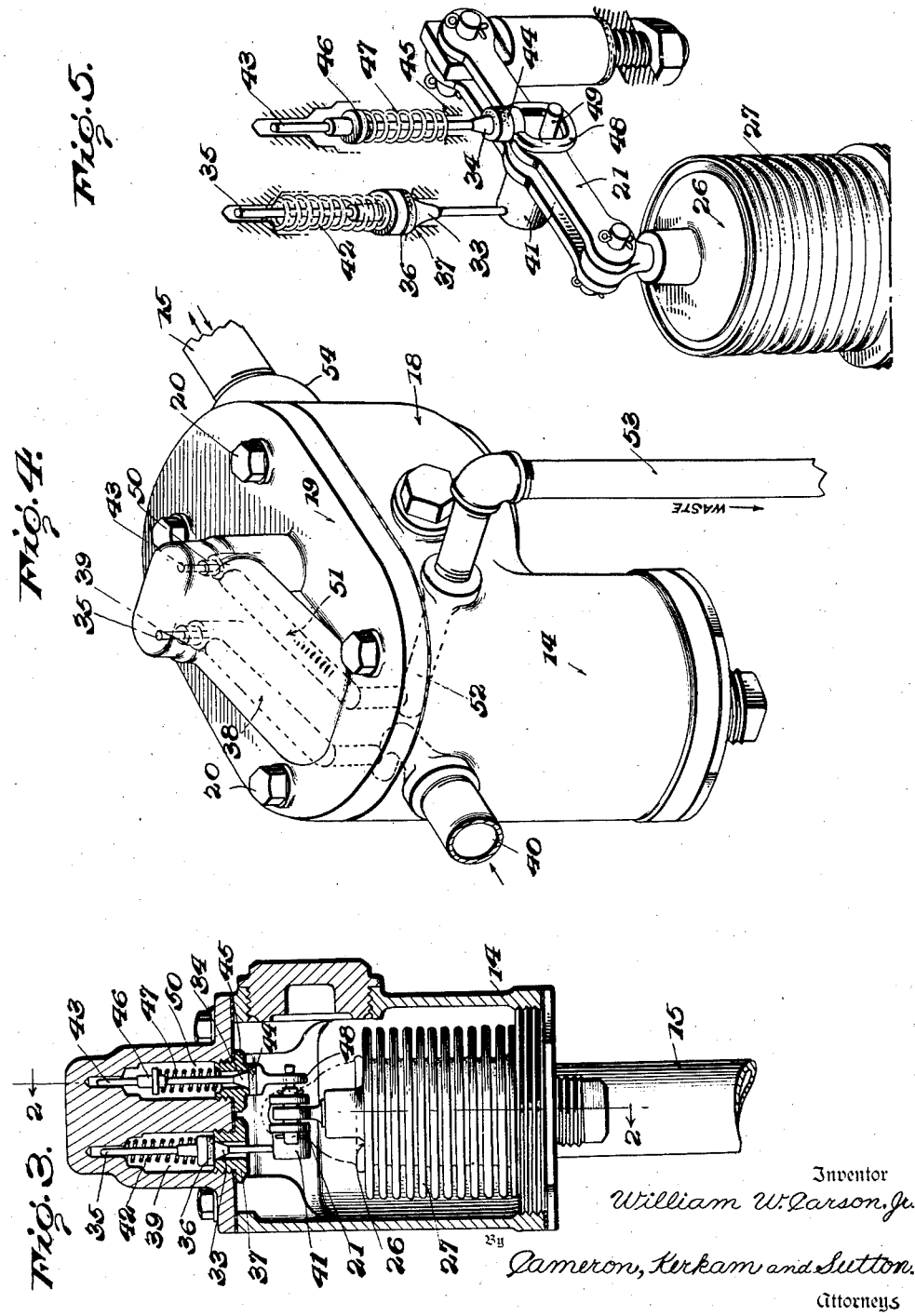

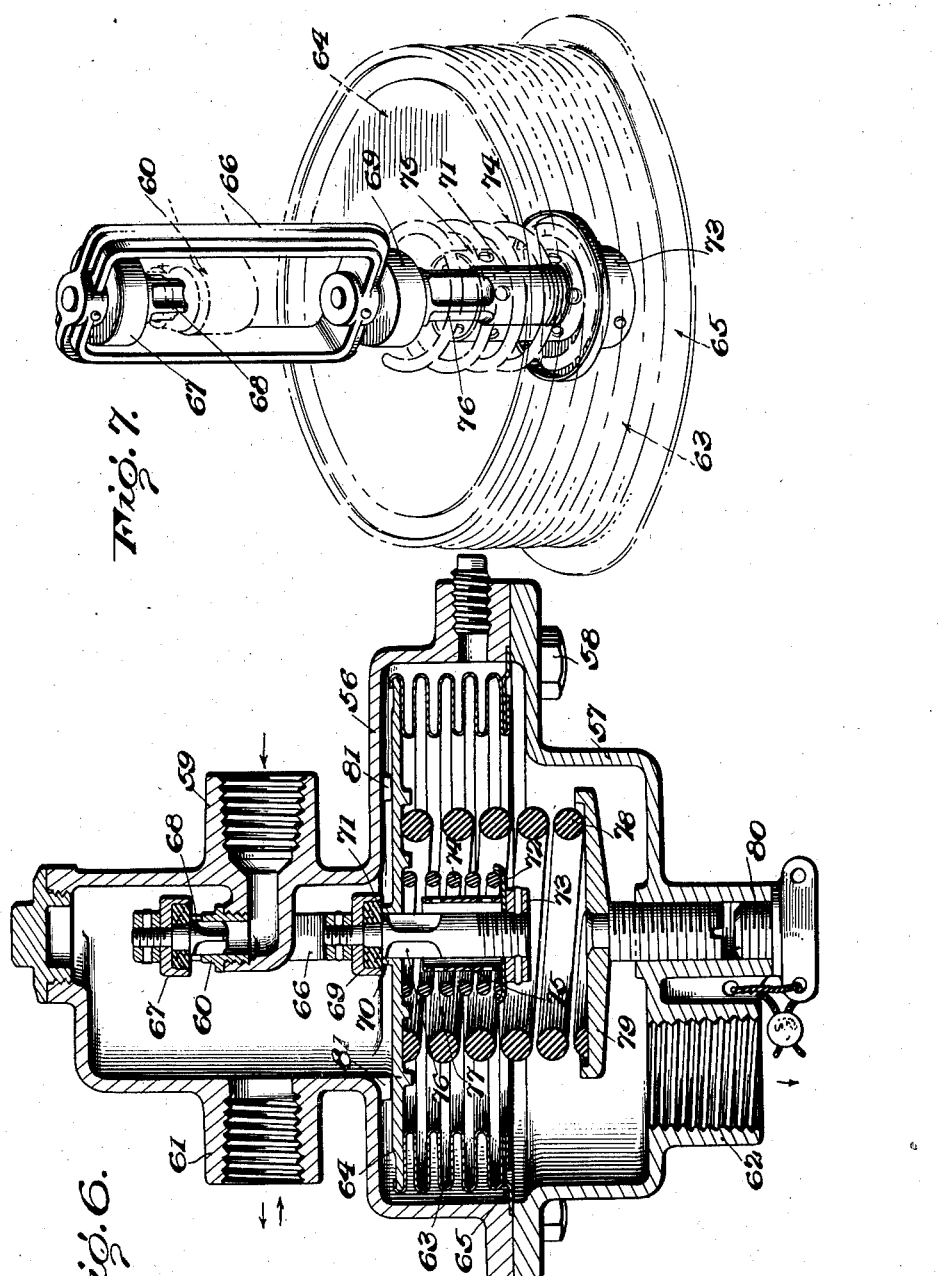

Patented June 5, 1934

1,961,550

UNITED STATES PATENT OFFICE 1,961,550

REGULATOR FOR HOT WATER HEATING SYSTEMS

William W. Carson, Jr., Knoxville, Tenn., assignor to The Fulton Sylphon Company, Knoxville, Tenn., a corporation of Delaware Application June 25, 1928, Serial No. 288,191

4 Claims. (Cl. 277—20)

This invention relates to hot water heating systems, and more particularly to a closed system of hot water heating in which the water is maintained under a predetermined pressure during the operation of the system.

Closed pressure systems may be operated at higher temperatures than the open systems, thus permitting the use of smaller radiators and smaller pipe sizes. The cost of installation is therefore less, and since a smaller volume of water is used, the system heats up quicker and is more responsive to regulation.

Closed systems have heretofore been proposed which embody an expansion tank in the basement of the building to be heated and rely on manual regulation to keep the pressure within prescribed limits, but such a system necessitates considerable personal attention to replace the air lost from the tank through leakage or by absorption in the water, and to replace water lost by leakage from the system. Furthermore unless a large and expensive expansion tank were installed, undesirably large variations in pressure in the system would result from changes in temperature, thus increasing air losses through absorption in the water which in turn reduce the effective size of the expansion tank.

It is an object of this invention to provide a closed hot water heating system embodying a novel form of valve control which maintains the pressure of the system within desired limits irrespective of variations of temperature thereof, leakage, air absorption, etc., thus eliminating the necessity for any expansion tank, and requiring no attention from the operator of the system after it has been installed and adjusted.

Another object of the present invention is the provision in a closed hot water heating system of novel means whereby water is automatically admitted and discharged therefrom in response to variations of pressure therein.

Another object of the invention is the provision in such a system of novel means whereby pressure is automatically maintained within certain fixed limits irrespective of the temperature or the absorption of air by or evolution of air from the heated water.

Another object of this invention is the provision of an automatic valve to connect a closed hot water heating system with a high pressure supply system, which reduces the pressure of the supply system to the pressure desired in the heating system, and discharges water from the heating system when the pressure rises above a predetermined limit.

Another object of the present invention is the provision of a unitary valve which combines the function of a reduction valve and a pressure relief valve.

Other objects and advantages of the present invention will be in part obvious and will appear to persons skilled in this art from the following description taken in connection with the accompanying drawings.

In the drawings:

Fig. 1 is an elevation of a generating plant and a portion of the circulating system embodying the present invention;

Fig. 2 is an enlarged vertical section taken substantially on the line 2—2 of Fig. 3 of one form of applicant's novel regulating valve;

Fig. 3 is a vertical section of the regulating valve taken substantially on the line 3—3 of Fig. 2;

Fig. 4 is an enlarged perspective view of the regulating valve with its connections;

Fig. 5 is a corresponding perspective view of the operating mechanism within the valve casing with the casing removed therefrom;

Fig. 6 is a vertical section of a modified form of regulating valve; and

Fig. 7 is a perspective view of the operating elements of the regulating valve illustrated in Fig. 6.

In Fig. 1 of the drawings numeral 10 indicates a hot water boiler of any suitable or preferred construction, provided with hot water supply mains 11, and return mains 12 and 13. It is to be understood that these mains are connected to the various radiators throughout the building to be heated, and form therewith a closed circulating system in which the water is heated in the boiler, flows outward to the radiators through the mains 11, and after having given up its heat through the radiators returns to the boiler through the mains 12 and 13.

It has heretofore been the practice, in systems of this character, to supply water to the circulating system through a manually operated valve from the water supply for the building, and to furnish an expansion tank above the highest point of the circulating system in order to take care of the different volumes of the water as the water varies in temperature. It has also been proposed, as above stated, to replace the gravity expansion tank referred to by a pressure expansion tank located usually in the vicinity of the boiler, and filled chiefly with air which forms a cushion against which the water in the system may expand as the temperature rises. This latter arrangement possesses the advantages of a pressure system above pointed out, but requires considerable attention from the operator to maintain the correct amount of water in the system and to pump air into the tank to replace that which has been absorbed by the water; moreover, the pressure in the system varies considerably as the water in the system expands and contracts, unless an undesirably large and expensive expansion tank is installed and is kept very largely filled with air to form a large cushion.

The present invention has overcome these disadvantages by incorporating in the system a means for automatically admitting sufficient water from the house supply to maintain the desired pressure in the system, said means also operating automatically upon a rise of pressure beyond the desired limit to discharge from the system sufficient water to maintain the desired pressure. In the present embodiment of the invention this automatic regulating means comprises a pressure and relief valve 14 connected to the circulating system in any suitable way as by means of the pipe connection 15, and connected to the house water supply through a filter 16 and a check valve 17, of any preferred construction.

One form of supply and relief valve which has proved satisfactory in service is illustrated in Figs. 2, 3, 4 and 5 of the drawings, but it is to be understood that the invention in its broad aspects is not limited to this particular form of supply and relief valve. In this embodiment of the invention the automatic valve consists of a casing 18 made of suitable form and material, and provided with a cover 19 suitably fixed thereto as by means of cap screws 20. A rocking lever 21 is mounted within the casing, having one end 22 suitably pivoted to a fixed fulcrum member 23 which is rigidly attached to the casing in any suitable manner as by means of nut 24. The opposite end 25 of lever 21 is suitably pivoted to the movable head 26 of a deeply-corrugated flexible metal bellows 27 the opposite end of which is rigidly fixed to the casing in any preferred manner as by means of a crimped and soldered connection with a threaded plug 28 which is adapted to be firmly screwed within a corresponding opening of the casing.

An expanding spring 29 is mounted within the bellows 27 and bears at one end against the movable head 26 and at the other end against an adjustable sleeve 30 which may be threaded in and out of the plug 28 in order to adjust the pressure of the spring 29. Movable head 26 of the bellows carries a suitable guide and stop member 31 for restraining the spring 29 and for limiting the collapsing of the bellows 27, and the adjusting sleeve 30 is provided with a vent opening 32 to the atmosphere in order to maintain the interior of the bellows at atmospheric pressure.

The central portion of the lever 21 is provided with suitable projections 41 and 49, best illustrated in Fig. 5, for operating an inlet valve 33 and an exhaust valve 34 in accordance with the motion of the head 26 of the flexible bellows 27. The inlet valve may be of any suitable construction, and is shown as comprising a stem 35 mounted in the cover 19 of the casing and carrying a valve member 36 adapted to cooperate with a seat member 37 suitably threaded in said cover. A conduit 38 (Fig. 4) connects the valve chamber 39 with the inlet 40 from the water supply. The lower end of the inlet valve stem 35 is adapted to cooperate with a laterally extending lug 41 on the side of the lever member 21, the arrangement being such that when the lever 21 rises due to expansion of the bellows member 27, the valve stem 35 will be raised and the inlet valve opened, the inlet being normally held closed by the pressure of the water supply and by a spring 42 within the valve chamber 39.

The relief valve 34 may be of any suitable construction and is shown as mounted in the cover 19 of the casing in parallel relation to the inlet valve 33 and comprises a valve stem 43 carrying a valve member 44 which is adapted to cooperate with a seat member 45 threaded in the cover 19. The stem 43 carries a spring abutment member 46 with which a spring 47 cooperates to maintain the valve normally closed, and also is provided at its lower end with a yoke member 48 which is adapted to cooperate with a pin 49 which extends laterally from the lever 21. The outlet valve chamber 50 is connected by conduits 51 and 52 (Fig. 4) to the waste pipe 53. The casing 18 is also provided with a threaded opening 54 which is adapted for connection through the pipe 15 to the circulating system, whereby the pressure within the casing is always the same as that within the heating system.

In operation, water from any suitable source of pressure supply is admitted through the strainer 16 and check valve 17 to the supply and relief valve 14. As long as the pressure in the heating system is below the desired point, for instance ten pounds per square inch, the flexible bellows 27 will expand under the action of spring 29, raising the lever 21 and holding open the inlet valve 33 by reason of the engagement of the lug 41 with the inlet valve stem 35. When the pressure within the heating system reaches the predetermined point, the bellows 27 will be compressed thereby and the lever 21 will be lowered sufficiently to allow the inlet valve 33 to close.

When the temperature of the water in the heating system is raised, the expansion of the water will increase the pressure in the system, and when this reaches the desired maximum, for instance fifteen pounds per square inch, the bellows 27 will be collapsed still further, thus lowering the lever 21 until the pin 49 engages the bottom of the yoke 48 of the exhaust valve stem 43, causing the exhaust valve 34 to open and discharge the excess volume of water. When the system again cools down the contraction of the water will decrease the pressure within the system and the supply valve will open, thus passing into the system enough water to maintain the minimum pressure.

It has been found in practice that the expansion of the water in the system and the operation of the valve occur simultaneously, and so gradually that the pressure within the system always remains between the upper and lower operating points of the supply and relief valve, this operating range being determined by the lost motion of the lever 21 with respect to the valve stems 35 and 43.

It has been found that in systems having about eight hundred square feet of water radiation the consumption of water averages about one gallon per day, depending somewhat upon the manner of firing the boiler. This water consumption may be still further reduced, if deemed desirable, by including a small expansion tank, but the use of such an expansion tank is of course not at all essential.

The pressure and relief valve is preferably located in the flow main as illustrated in Fig. 1, in order that the air liberated from the heated water will collect therein and be discharged when the relief valve operates. It is obvious, however, that the device will function satisfactorily if located elsewhere in the system as, for instance, in the return main thereof, and such a modification is within the contemplation of the present invention.

Figs. 6 and 7 illustrate another form of supply and relief valve which has also proved satisfactory in a closed hot water system. As there shown the valve casing is formed of two parts 56 and 57 fastened together in any suitable way as by means of cap screws 58. The casing part 56 is provided with an inlet connection 59 having an inlet valve seat 60 threaded therein, and is also provided with a fitting 61 adapted to be connected to the heating system whereby the pressure within the part 56 of the casing is always the same as the pressure within the heating system. The part 57 is provided with a fitting 62 adapted to be connected to a waste pipe under atmospheric pressure whereby the part 57 of the casing is always under atmospheric pressure. The chambers formed by the two casing parts 56 and 57 are separated from each other by a flexible bellows 63 having a movable end 64 and a fixed end 65 securely clamped between the two parts 56 and 57 of the casing.

A yoke member 66 is mounted in the casing part 56, and is provided at its upper end with an inlet valve member 67 adapted to cooperate with the inlet valve seat 60, and having a valve stem 68 adapted to slide therein. The yoke member 66 carries at its lower end an outlet valve member 69 suitably fixed thereto as by means of a stem 71 threaded and pinned to the yoke, said valve member being adapted to cooperate with a central valve seat 70 formed in the movable head 64 of the bellows. The valve stem 71 carries at its lower end a spring seat member 72 suitably adjustable thereon as by means of an adjusting nut 73, and a spring 74 is confined between said spring seat member and the lower surface of the movable bellows head 64. A stop member 75 is also located between the seat member 72 and the movable head 64 of the bellows to limit the compression of the spring 74. The valve stem 71 is suitably channeled as shown at 76, and the stop member 75 is perforated as shown at 77 in order to allow the water to escape which passes through the outlet valve when it is open.

It will thus be seen that the yoke 66, valve members 67 and 69 and valve stems 68 and 71 form a unitary structure which is slidable with respect to the movable end wall 64 of the bellows, and which is held with the valve member 69 bearing on the valve seat 70 of said end wall by means of the spring 74.

The bellows 63 is held extended by means of a spring 78 which bears at its upper end against the under side of the movable end wall 64 and which rests at its lower end in a spring follower 79 which is adjustable within the end wall of the casing part 57 in any suitable manner as by means of the threaded connection illustrated. Unauthorized changes of adjustment of this member are prevented by suitable means such as the threaded plug 80 which closes the adjusting aperture, and which is suitably sealed in place. Expanding motion of the movable end wall 64 of the bellows is limited by shoulders 81 on the casing part 56, and the adjustments of the parts are such that when the bellows head 64 is in its expanded position as illustrated in Fig. 6, the inlet valve 67 is raised from its seat in order to allow water to flow from the source of supply into the system. The relief valve 69 is then held closed, as shown, by the spring 74.

The spring 78 is adjusted so that the desired minimum pressure, for instance ten pounds per square inch, is required to compress the spring sufficiently to move the head 64 and the valve members until the valve member 67 rests on the inlet valve seat 60 and closes the same. The spring 74 determines the additional pressure necessary to open the exhaust valve 69, 70 and is set to provide the desired variation in pressure.

In operation water will be admitted to the system through the inlet 59 and inlet valve 67, 60 until the pressure within the system, and consequently within the casing part 56, rises sufficiently to force the movable head 64 of the bellows against the spring 78 and close the inlet valve 67, 60. When the temperature of the water in the system rises, the water expands and the pressure rises still further and the movable head 64 of the bellows is still further depressed. Since, however, the inlet valve member 67 is resting upon the seat 60, the assembly of the inlet and outlet valves and yoke cannot follow the movable head 64, so that the outlet valve seat 70 moves away from the valve member 69 against the action of the spring 74, and allows the excess volume of water to escape through the outlet valve and the connection 62 to the waste pipe.

It will be seen that there is here provided a closed type of hot water heating system which is adapted to operate constantly at a predetermined pressure, and which requires practically no attention from the operator except the original turning on of the water from the supply system, and the venting of the radiators of air.

While the embodiments of the invention illustrated in the drawings have been described with considerable particularity, it is to be expressly understood that the invention is not to be restricted to the embodiments shown and described, as various other embodiments will now suggest themselves to those skilled in the art. Various changes may be made in the details of construction, arrangement and proportion of parts, and certain features may be used without other features. Reference is therefore to be had to the claims hereto appended for a definition of the limits of the invention.

What is claimed is:

1. In a regulator for a closed hot water heating system, pressure regulating means comprising an inlet valve, a relief valve, yielding means normally maintaining said valves closed, a flexible member adapted to be subjected to the pressure of the circulating system, and laterally aligned abutment means connected to the member and adapted to engage and actuate said valves.

2. In a regulator for a closed hot water heating system, pressure regulating means comprising an inlet valve, a relief valve, yielding means normally maintaining said valves closed, a flexible member adapted to be subjected to the pressure of the circulating system, and oppositely directed abutment means connected to the member and adapted to engage and open the inlet and relief valves in response to predetermined changes of pressure in the system.

3. In a regulator for a closed hot water heating system, an automatic pressure regulating device comprising a valve chamber adapted to be connected to the circulating system, oppositely movable inlet and relief valves for the chamber, a flexible member adapted to be subjected to the pressure in the chamber, and oppositely directed abutments connected to said member and adapted to engage and actuate said valves.

4. In a regulator for a closed hot water heating system, an automatic pressure regulating device comprising a collapsible member adapted to be subjected to the pressure in the system, a lever pivoted to the collapsible member and having a fixed fulcrum, normally closed inlet and relief valves arranged adjacent the lever, means on opposite sides of the lever adapted to engage and operate said valves and adjustable spring means opposing the collapsing of the member.

WILLIAM W. CARSON, Jr.